May 15, 1962 J. S. GLASGOW ET AL 3,034,619
DRIVE SYSTEM
Filed Nov. 30, 1959 3 Sheets-Sheet 1
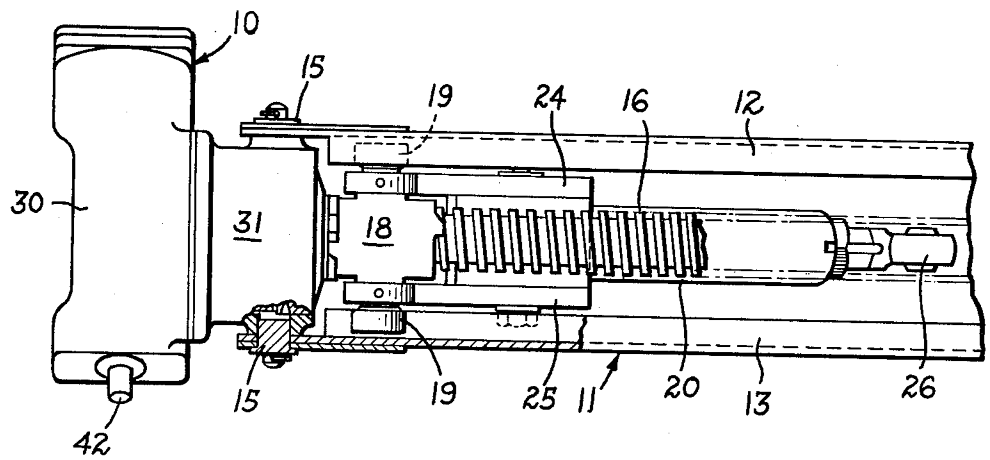
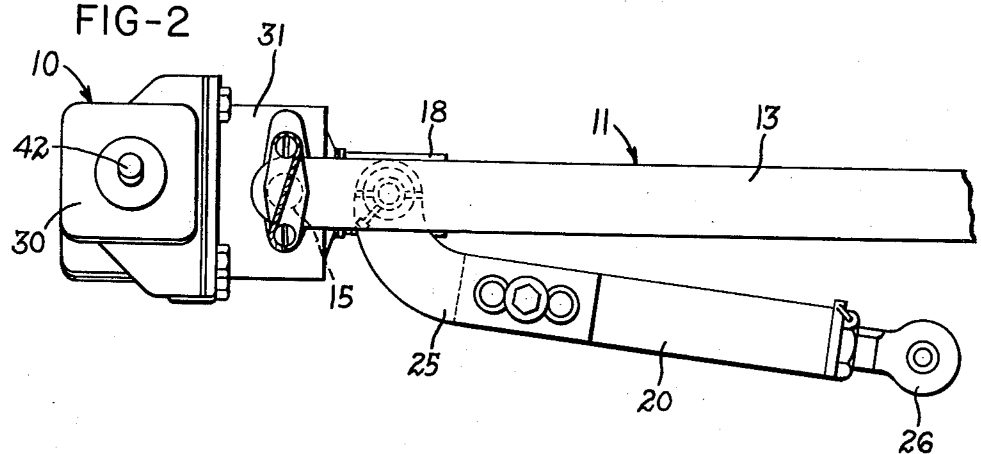
INVENTORS
JAMES S. GLASGOW &
RICHARD H. KERR
BY
Marechal, Biebel, French & Bugg
ATTORNEYS

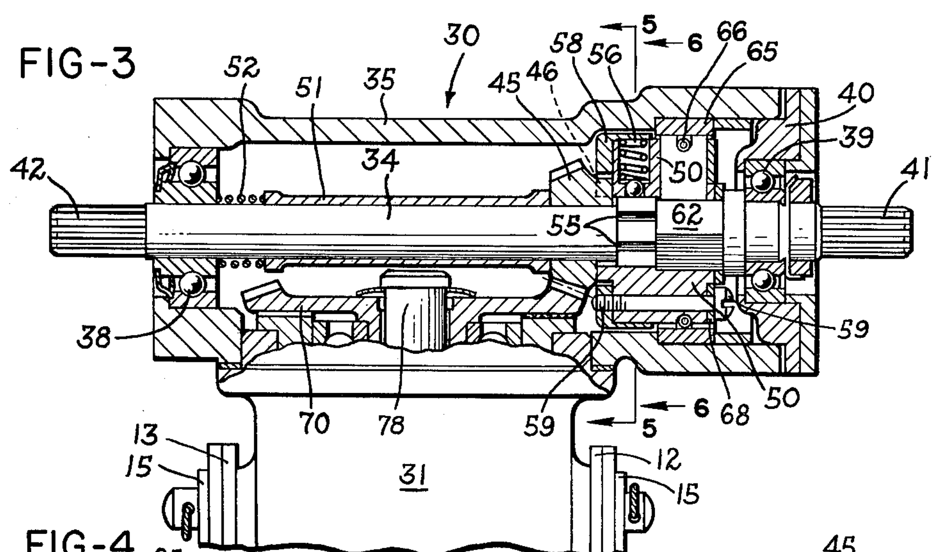
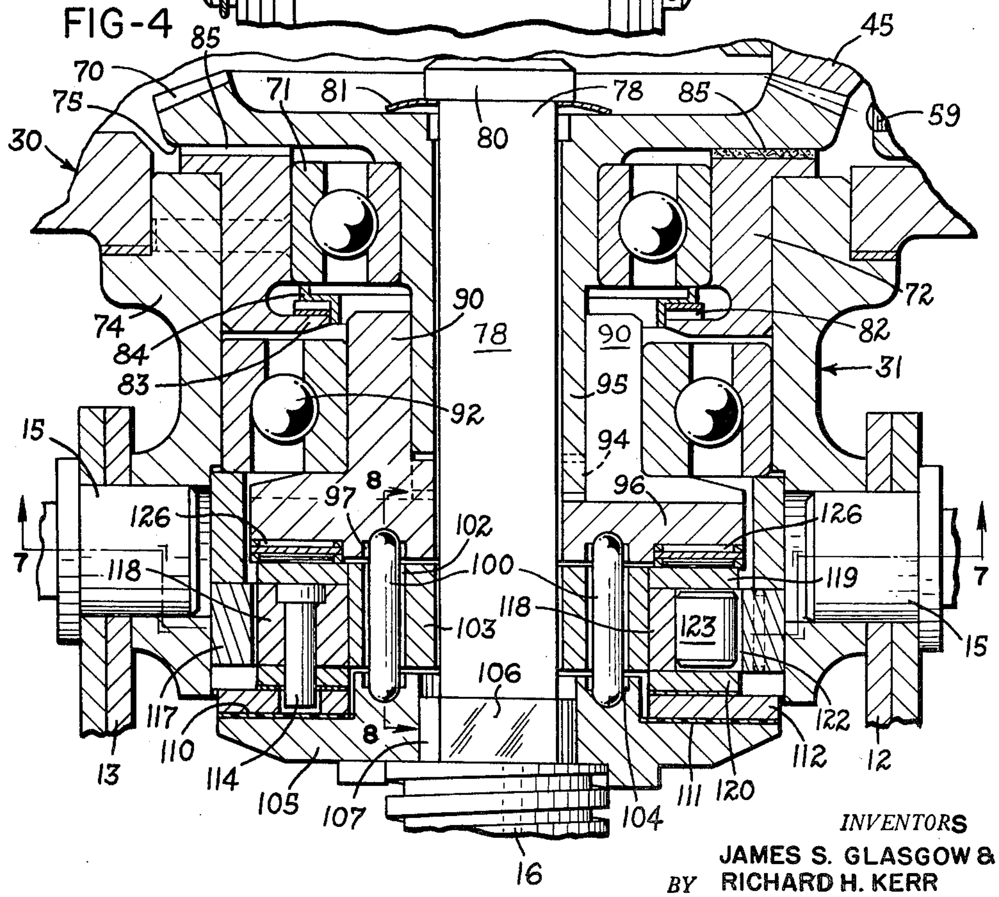
INVENTORS
JAMES S. GLASGOW &
BY RICHARD H. KERR
Marechal, Biebel, French & Bugg
ATTORNEYS

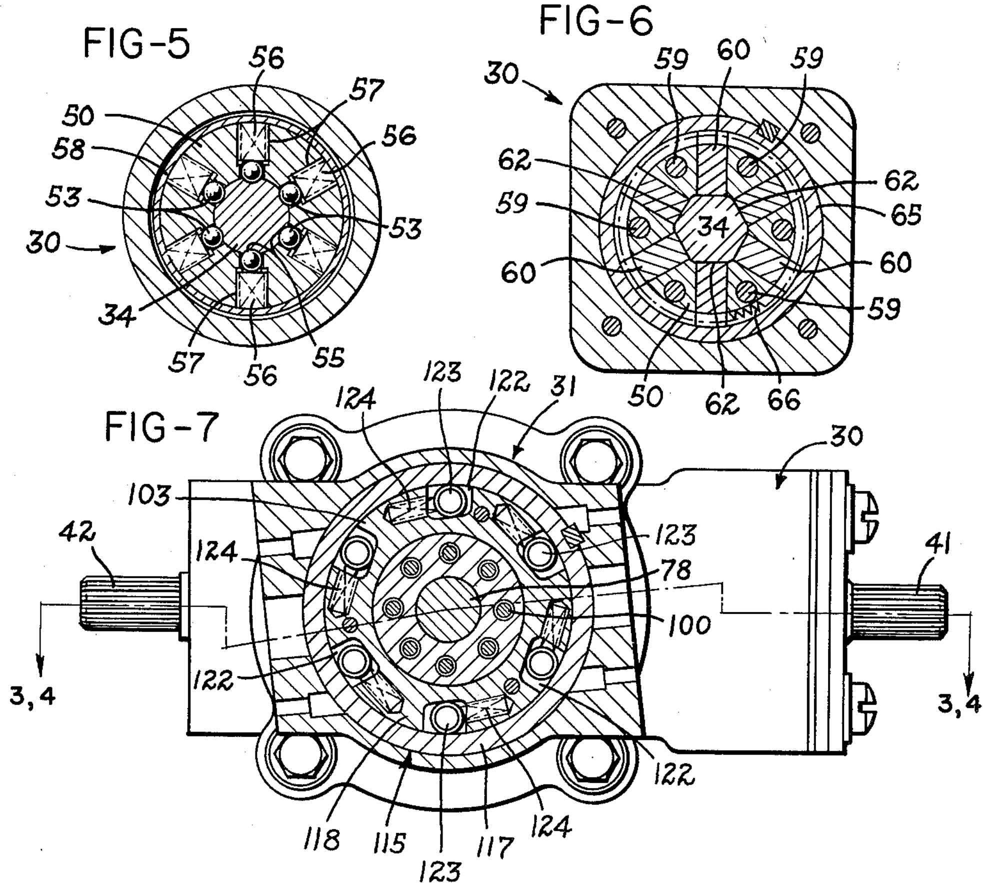
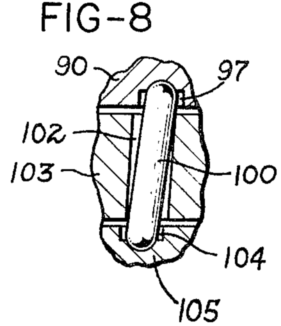
INVENTORS
JAMES S. GLASGOW &
BY RICHARD H. KERR
Marechal, Biebel, French & Bugg
ATTORNEYS United States Patent Office 3,034,619
Patented May 15, 1962

3,034,619
DRIVE SYSTEM

James S. Glasgow, Springfield, and Richard H. Kerr, West Milton, Ohio, assignors to The Steel Products Engineering Company, Springfield, Ohio, a corporation of Ohio Filed Nov. 30, 1959, Ser. No. 856,266
6 Claims. (Cl. 192—7)

This invention pertains to a drive system and more particularly to such a system for transmitting power between two moving parts in response to an initiating signal.

The system of this invention has particular advantage in mechanisms for the controlled movement of a load which tends overrun the control mechanism in a direction of movement. It is well known that control of an overrunning load may be accomplished by the interposition of a drag, such as by a friction brake, between a driving element and the load, which drag is at all times in excess of the maximum expected overrunning load, and then driving the load with a force sufficient to overcome the drag of the brake. A principal disadvantage of such an arrangement resides in the fact that the friction brake absorbs a constant, and maximum, work loss at all times during movement, irrespective of the magnitude of the overrunning force at a particular instant. Also, the power source and associated driving components must be designed to provide an overriding force, as necessary, to drive the load by overcoming the drag or by overcoming the difference between the drag and the overrunning force of the load.

These disadvantages are largely overcome by the system of this invention wherein a drag effected by a restraining element, such as a brake, is modulated according to the magnitude of the overrunning load to provide increased restraining force or drag with increased overrunning force, holding the load from overrunning movement. Thus, the total restraining force necessary is dictated by the requirements of the overrunning force of the load. The load, in turn, is not readily subject to variation or control in that it is usually governed by the design of the system. However, the restraining force is subject to further control, and this is effected by a connection between a driving element and the brake to apply a component of the driving force in opposition to the overrunning force so as to reduce the restraining force, allowing the movement of the load with the driver. The arrangement of the mechanism of this invention is such that tendency for the generation of chatter or self-induced cyclic vibration between the relatively moving force restraining components is reduced or eliminated.

The invention also provides for the reverse driving of the load, and includes provision for the circumvention of the restraining force during the driving of the load in a direction opposite to the overrunning direction. Therefore, an advantage of this invention resides in the efficient use of driving power with a minimum of losses while maintaining absolute control over the load. An embodiment of this invention is described as applied to a screw-type linear actuator where it is desired to use the power of a rotating shaft to engender motion and force along a straight line. Typical of such applications include the raising and lowering of loads, and the specific example described concerns the movement of an aircraft control surface, such as wing flap. A wing flap actuator provides a good illustration of a preferred embodiment of this invention since a positive force is required to lower the flaps, and the flaps tend to overrun the control mechanism in raising due to the air pressure. Further, it is desirable that the flap be held against overrunning movement when no power is applied to the actuator, or upon the failure of the power source.

It is therefore an object of this invention to provide a mechanism as outlined above for the control of an overrunning force with a minimum of losses.

A further object of this invention is the provision of a mechanism as outlined above for the control of an overrunning load which automatically holds the load in position upon the failure or removal of a driving force or in the absence of a driving signal.

A further object of this invention is the provision of a drive mechanism as outlined above to control an overrunning load without generating self-induced cyclic vibration into the system.

A still further object of this invention is to provide a drive mechanism as outlined above for the control of an overrunning load by a restraining force wherein the application of the restraining force is proportioned to the magnitude of the overrunning load.

Another object of this invention is to provide a driving mechanism as outlined above with a restraining force preventing the movement of an overrunning load and arranged to apply a signal in the form of a component of a driving force from a power source in a direction tending to overcome the restraining force when movement is desired.

A further object of this invention is to provide a drive mechanism as outlined above utilizing a frictional restraint to prevent movement in an overrunning direction including mechanism to control the magnitude of the restraining force independently of changes or differences in the coefficient of friction.

Other object and advantages of the invention will be apparent from the following description, the accompanying drawings and the appended claims.

In the drawings—

FIG. 1 is a plan view of a linear actuator embodying this invention with a portion of the lead screw and track broken away to expose details of the track rollers;

FIG. 2 is an elevational view of the actuator of FIG. 1;

FIG. 3 is a section of the input shaft portion of the actuator housing with the output drive portion being partially shown in plan;

FIG. 4 is an enlarged cross sectional view of the output drive portion of the actuator gear box, the section of FIGS. 3 and 4 being taken generally along the reference line 3, 4—3, 4 of FIG. 7;

FIG. 5 is a section through the input shaft portion of the housing taken generally along line 5—5 of FIG. 3;

FIG. 6 is a further section through the input shaft portion taken generally along line 6—6 of FIG. 3;

FIG. 7 is a section through the output drive portion of the housing showing the details of the one-way drive arrangement, generally to the scale of FIG. 3, taken along line 7—7 of FIG. 4; and FIG. 8 is a fragmentary section showing one of the arrangements of the driving pins taken generally along line 8—8 of FIG. 4.

Referring to the drawings, which illustrate a preferred embodiment of this invention, a linear screw-type actuator embodying the teachings of this invention is illustrated in FIGS. 1 and 2 as including a gear drive housing 10 and a guide track 11 mounted thereon. The track 11 is formed with spaced roller receiving U-shaped guides 12 and 13 each of which is mounted on the housing 10 on bushings 15. Linear motion of a load is effected by means of a lead screw 16 adjacent the track 11. The screw 16 has an inner end mounted for rotation within the housing 10 and an outer or extended end (not shown) rotatably supported by the track 11. A nut 18 is mounted upon the screw 16 for linear axial movement upon the rotation of the screw and has a pair of oppositely spaced rollers 19 arranged for low friction guided movement within the guides 12 and 13 of the track 11. The nut 18 may be of the recirculating ball type characterized by low friction and high mechanical efficiency.

The actuator includes an actuator arm 20 with one end connected for extended and retracted movement with the ball nut 18. The arm 20 is pivotally mounted on the nut 18 between the rollers 19 by a pair of curved support plates 24 and 25. The extended end of the arm 20 is terminated in an eye bolt 26 which provides the means for the attachment of the actuator to a load. For the purpose of the description of the specific example of the embodiment, it is assumed that the eye bolt 26 is connected to actuate a wing flap of an aircraft with the extended movement of the nut 18 and the arm 20 effective to lower the flap into an operative position and retracted movement thereof being effective to raise the flap into an inoperative position.

It is well known that wing flaps provide a substantially unidirectional load to an actuating device. During flap extension, the movement of the flap is resisted by air pressure, and during retraction the movement is aided by air pressure in such a manner as to tend to overrun the driving mechanism. The load is not uniform but varies according to the position of the flap and the air speed of the aircraft. Upon the failure or stoppage of the power, it is necessary that the load be securely held in position and restrained from movement. It is desired in connection with the operation of aircraft flaps to hold the flaps in position against movement in the absence or failure of motivating power since a failure of power would be most undesirable if the flaps were permitted to retract during landing or take-off by overrunning the actuator mechanism.

Examples of additional specific requirements for the control of flaps are as follows: If the driving torque applied to the input shaft 34 exceeds a specified overload of the rated torque in screw compression, it is desirable that the drive mechanism be positively locked out to prevent damage. Also, if the driving torque applied to the input shaft 34 exceeds a specified fraction of the rated torque in screw tension, it is also desirable to lock out the driving mechanism to protect the flaps and the wing against distortion or other damage.

The above requirements are met by the mechanism within the housing 10 which includes an input shaft portion 30 and an output drive portion 31. In the interest of clarity, the drive portion 31 is shown in enlarged section in FIG. 4 as compared to the input portion 30 in FIG. 3. Referring first to FIG. 3, an input shaft 34 is shown as being rotatably mounted within a body 35 on a bearing 38 at one end of the body 35 and on a bearing 39 within a bearing cap 40 at the other end of the body. The shaft 34 has opposite exposed splined ends 41 and 42, either one of which may be used to drive the actuator by any suitable power source, not shown, such as a reversible hydraulic motor.

Means connected to the shaft 34 for transmitting driving torque therefrom and for effecting a positive lockout of the shaft upon the occurrence of a torque in excess of a predetermined maximum includes a beveled driving pinion 45 mounted on the shaft 34 but not directly connected thereto. The pinion 45 is driven from the shaft 34 by means of a face key 46 in driving engagement with a driving block 50. The pinion 45 is held in driving position against the block 50 by a tubular sleeve 51 and a compression spring 52 on the shaft 34.

The block 50 and the shaft 34 include cooperative portions of a detent connection for effecting the rotation of the block 50 with the shaft. As is shown most clearly in FIG. 5, a plurality of balls 53 are received in radially spaced openings formed in the block 50 adjacent the shaft 34. The balls 53 are biased into cooperating ball accepting grooves 55 on the shaft 34 by detent springs 56 received in radial passageways 57 formed in the block 50 adjacent the balls. An annular cup-shaped retainer 58 is secured against the inner face of the block 50 by bolts 59 to hold the springs 56 in compression against the balls 53 for effecting a driving connection between the shaft 34 and the block 50. However, upon the occurrence of a torque in excess of a predetermined maximum driving torque, the balls 53 will be biased out of the grooves 55 to permit relative motion between the shaft 34 and the block 50.

A positive lock of the shaft 34 against further rotation upon the occurrence of such a torque includes a plurality of shoes 60 arranged for radial sliding movement within the block 50, the arrangement of which is most clearly shown in FIG. 6. The shoes 60 have flattened inner ends in abutment with cooperative flattened side portions 62 formed on the shaft 34, and rounded outer ends normally forming a running clearance between the block 50 and a keyed friction ring 65. A garter spring 66 holds the shoes 60 in a normal seated position against the flattened shaft portions 62. A shoe retainer ring 68 is held against the outer face of the block 50 for the retention of the shoes 60 within the block by the bolts 59. Therefore, upon the occurrence of a torque sufficient to effect the release of the detent connection of the balls 53 in the grooves 55, the resulting rotation of the block on the shaft 34 causes the outward movement of the shoes 60 into engagement with the friction ring 65. The camming action of the flattened portions 62 with respect to the bottom of the shoes causes the shoes to be self-locking against the ring 65 so that a positive lock-out of the shaft 34 results until the balls 53 are returned to their detent position in the groove 55.

The bevel pinion 45 is in constant driving mesh with a bevel gear 70 rotatably mounted within the output portion 31 on a ball bearing race 71. A bearing pilot sleeve 72 is positioned between the race 71 and the inside wall of the housing 74 of the portion 31.

The pilot sleeve 72 cooperates with the flattened back face 75 of the gear 70 to provide a drag under certain conditions of operation to effect the locking of the input shaft 34 by the shoes 60 at one value of torque with the lead screw 16 in tension, for the purpose outlined above. It is seen that the lead screw 16 includes an inner end 78 extending through the gear 70 and terminating in a head or cap 80 on the outer surface of the gear. A Belleville spring 81 is interposed between the cap 80 and the gear 85. Also, a wave washer 82, of greater spring force than the spring 81, is positioned between a washer retaining lip 83 on the pilot sleeve 72 and a spacer 84. The wave washer 82 provides a normal running clearance between the back face 75 of the gear 70 and pads 85 of frictional material on the surface of the pilot sleeve 72 adjacent the gear 70. It is contemplated that the lead screw 16 will normally run in compression for either direction of travel of the nut 18 since the connected load tends to overrun during retraction. Nevertheless, it is possible that under some conditions, such as during a portion of the retraction, tension will be exerted in the lead screw, such as for overcoming friction or binding within the flap mechanism. This tension operates to draw the gear 70 through the cap 80 against the wave washer 82 by compressing the Belleville spring 81 to bring the face 75 into contact with the friction pads 85, thereby artificially inducing a rotational load to effect input shaft lock-out at a reduced output torque to prevent damage or distortion to the wing or flap mechanism.

Means for connecting the gear 70 and hence the shaft 34 in driving relation to the ball screw 16 includes a driving dog 90 rotatably mounted within the housing 74 on a bearing 92 and in driven engagement with a face key 94 on the extended tubular end 95 of the gear 70. The dog 90 is formed with a radially extending face 96 which is recessed at 97 to receive the upper ends of a plurality of torque transmitting members of fixed length consisting of driving pins 100. The bodies of the pins 100 are received within slightly angled or diagonal openings 102 formed through a disk 103, as shown in FIG. 8. The lower ends of the pins 100 are received in cooperating recesses 104, similar to the recesses 97, formed in a friction plate 105. The plate 105 is, in turn, mounted for rotation with the screw 16 on flats 106 formed on a shouldered portion 107 of the ball screw 16. It will therefore be seen that the rotation of the dog 90 in either direction, effected by the gear 70, will effect rotation of the disk 103 and the plate 105 through the pins 100.

The plate 105 constitutes a first relatively and axially movable brake element with a flat disk braking surface 110 arranged for engagement with friction material 111 on a second brake element consisting of a disk 112. The disk 112 is connected by pins 114 for rotation in one direction only on a one-way brake or "no back" indicated at 115 in FIG. 7, and accordingly, exerts a braking force with the plate 105 only in the direction in which it is held from rotation by the brake 115 within the housing 74.

The one-way brake 115, or "no back," includes an outer ring 117 keyed in the housing 74 and an inner ring 118 with attached top and bottom annular roller retaining plates 119 and 120. The inner ring 118 is formed with angled recesses 122 adjacent the inside surface of the outer ring 117 within which are received brake rollers 123. The rollers 123 are biased into camming relation against the walls of the recesses 122 and the ring 117 by springs 124 providing for unidirectional rotation of the inner ring 118 and its attached plates 119, 120 and disk 112. This direction of movement corresponds to the extending movement of the nut 18 on the screw 16 against the load so that the extension or lowering of the flaps is accomplished with a minimum of friction.

As explained above in connection with the torque lockout, tension in the screw 16 is transmitted to the housing 74 by the spring 81 through the face 75 of the gear and the wave washer 82 through pilot sleeve 72. On the other hand, a positive load on the nut 18 results in an axial force or thrust applied to the screw in the opposite direction. This thrust is transmitted to the actuator through the plate 105. The greater the overrunning force of the load, the greater will be the force of frictional engagement between the plate 105 and the disk 112. The resulting drag is greater than the rotational force of the overrunning load and therefore holds the load from movement, yet varies according to the magnitude of the load and is independent of the coefficient of friction of the material 111. There is no need to overcome this brake drag during extending movement of the nut 18 since the one-way brake 115 provides for movement of the disk 112 with the plate 105 in this direction.

However, movement in the opposite or overrunning direction is resisted by this drag, and the invention provides means for relieving this drag by proportioning or dividing this thrust. This is accomplished by applying a component of the driving force to the plate 105 in a direction opposing the overrunning thrust of the load by means of the pins 100. As perhaps is best shown in FIG. 8, this is accomplished by providing pins 100 of slightly greater length than the shortest distance between the cooperating pin receiving recesses 97 and 104. The diagonal slant of the opening 102 in the disk 103 prevents the pins 100 from moving over center.

It is therefore seen that on signal from the power source coupled to the input shaft 34, the dog 90 is moved to the left in FIG. 8 thereby tending to erect the pins 100 against the resistance of the Belleville spring 81 and the load on the plate 105. The spring 81 provides for the erecting movement of the pins 100 upon the driving of the pins by the axial movement of the plate 105, and since the spring 81 is compressed with less force than the washer 82, engagement of the gear 70 with the pads 85 is avoided. The axial force of the pins 100 on the plate 105 opposes the axial thrust applied to the plate 105 by the spring 81 and the load and permits the rotation of the plate 105 at the exact rate of rotation of the dog 90. A radial needle bearing 126 is interposed between the plate 119 and the face 96 of the dog 90 to provide for low frictional movement of the dog in the overrunning direction.

The arrangement of this mechanism is not dependent upon the provision of a particular value of the coefficient of friction between the brake elements, nor is it adversely affected by non-uniformity or changes in such coefficient since the pins 100 act directly upon one of the brake elements to divide thrust, as necessary, to provide for load movement. Accordingly, the device is substantially free of self-induced cyclic vibrations between the relatively moving brake components occasioned by the transition or oscillation between the static and kinetic state. However, any tendency for the occurrence of such "static-slip" may be avoided by the employment on one of the surfaces of a material which has an increasing coefficient of friction with increasing speed. Suitable materials include polytetrafluoroethylene and trifluorochloroethylene resins sold respectively under the trade names of Teflon and Kel-F, and a layer of such material may be used for the friction material indicated at 111 on the disk 12.

The operation of this invention is largely self-explanatory from the above description. A power source, such as a reversible hydraulic motor, may be arranged to drive the input shaft 34 in either direction to effect extension and retraction of the nut 18 and concomitant movement of a load carried thereon. Jamming of the mechanism, excessive load resistance, or other difficulties resulting in a torque in excess of a predetermined maximum input torque effects lockout of the input shaft 34 against further rotation by means of the shoes 60 within the block 50. The point at which this lock-out occurs may be proportioned according to whether the lead screw is in tension or in compression by artificially inducing a load in tension as described in connection with the frictional engagement of the back 75 of the gear 70 with the pads 85 on the sleeve 72.

There is no direct driving connection between the spur gear 70 and the inner end 78 of the lead screw 16, but the gear 70 drives the dog 90 through the face key 94. In driving the lead screw in the non-overrunning direction, such as during the lowering of the flaps, the one-way brake 115 provides for the rotation of the plates 120 and 112 so that the drive is accomplished through the pins 100 with a minimum of frictional loss. However, in driving in the reverse or overrunning direction, the plates 112 and 120 are held relative to the housing and the drive is effected through the proportioning of the thrust by the pins 100, which tend to straighten axially of the lead screw 16 and apply an axial component of the force outwardly in a direction tending to relieve the frictional engagement of the surface of the plate 105 with the surface of the plate 112.

An overrunning load is held from movement at all times except when movement is desired, and this is accomplished with a minimum of heat losses by varying the holding force according to the magnitude of the overrunning load, and by proportioning the thrust by providing a signal in force opposition to the thrust. In every instance, this proportioning of thrust is just enough to provide for the movement of the load through the brake at the rate established by the input and is not adversely affected by changes in the coefficient of friction between the brake elements. Also, provision is made for putting work into the lead screw 16 in the overrunning direction so that complete control is effected of a load which may tend to overrun only during a portion of its travel, or perhaps sporadically. The proportioning of thrust is accomplished by the pins 100 positioned between the driving dog 90 and the plate 105 and which are set at an inclination to the axis of rotation. The pins 100, accordingly serve the purpose of transmitting rotational torque for either direction of rotation from the dog 90 to the screw 16, and further serve to apply an axial component of the driving force in opposition to the thrust in the overrunning direction to provide for the rotation of the plate 105 on the disk 112. The employment of the material 111 assures the elimination of "stick-slip" or self-induced cyclic vibrations during the movement of the load while absorbing the overrunning thrust.

While the form of apparatus herein described constitutes a preferred embodiment of the invention, it is to be understood that the invention is not limited to this precise form of apparatus, and that changes may be made therein without departing from the scope of the invention which is defined in the appended claims.

What is claimed is:

1. A linear motion actuator for positioning a load which tends to overrun in one direction of movement comprising a gear housing, an input shaft in said housing adapted for rotation by a power source, a ball nut track mounted in extending relation from said housing, an extended ball lead screw rotatably mounted on said housing and positioned adjacent said track, a load carrying ball nut on said screw arranged for guided extending and retracting linear movement within said track upon the rotation of said screw, means in said actuator providing for limited axial movement of said screw in response to the overrunning force of the load carried by said nut, means in said housing for effecting rotation of said screw including a driving dog rotatably mounted in said housing and connected in driven relation to said input shaft, a one-way brake having one element fixed to said housing and another element arranged for rotation only in a direction corresponding to the direction of rotation of said lead screw during movement of said load in a non-overrunning direction, a plate connected for rotation on and axial movement with said screw and arranged for frictional engagement with said other element with increasing force with increasing axial overrunning thrust on said screw to hold said load against overrunning movement, and a plurality of rigid drive elements extending between said dog and said plate for effecting rotation of said plate and being inclined for effecting an axial force on said plate in a direction opposing said thrust providing for the relief of said frictional engagement when movement in the overrunning direction is desired.

2. An aircraft wing flap actuator for positioning a flap in response to a signal from a power source comprising a gear housing, an input shaft in said housing adapted for rotation by said source, a ball nut track mounted in extending relation from said housing, an extended ball lead screw rotatably mounted on said housing and positioned adjacent said track, a ball nut on said screw arranged for guided extending and retracting linear movement within said track upon the rotation of said screw and adapted to lower and raise an aircraft wing flap respectively with said linear movement, means providing for limited axial movement of said screw in response to the axial thrust on said nut, means in said housing for effecting rotation of said screw including a driving dog connected in driven relation to said input shaft, a one-way brake having a first element fixed to said housing and a second element arranged for rotation only in a direction corresponding to the direction of rotation of said lead screw during extension of said nut, a plate connected for rotation and axial movement with said screw and arranged for frictional engagement with said second element with increasing force with increasing axial overrunning thrust, drive means connecting said dog to said plate for effecting rotation of said plate in either direction according to the rotation of said input shaft including pins extending on a diagonal between said dog and said plate for effecting an axial force on said plate in a direction opposing the said axial thrust providing for the proportional decrease of frictional engagement between said plate and said second element during retracting movement of said nut.

3. An aircraft wing flap actuator for positioning a flap in response to a signal from a power source comprising a gear housing, an input shaft in said housing adapted for rotation by said source, a ball nut track mounted in extending relation from said housing, an extended ball lead screw rotatably mounted on said housing and positioned adjacent said track, a ball nut on said screw arranged for guided extending and retracting linear movement within said track upon the rotation of said screw and adapted to lower and raise an aircraft wing flap respectively with said linear movement, means providing for limited axial movement of said screw in response to the axial thrust on said nut, means in said housing for effecting rotation of said screw including a driving dog rotatably received in said housing and connected in driven relation to said input shaft, a one-way brake having a first element fixed to said housing and a second element arranged for rotation only in a direction corresponding to the direction of rotation of said lead screw during extension of said nut, a plate connected for rotation and axial movement with said screw and arranged for frictional engagement with said second element with increasing force with increasing axial overrunning thrust, drive means connecting said dog to said plate for effecting rotation of said plate in either direction according to the rotation of said input shaft including pins extending on a diagonal between said dog and said plate for effecting an axial force on said plate in a direction opposing said axial thrust providing for the proportional decrease of frictional engagement between said plate and said second element during retracting movement of said nut, and torque lock-out means in said housing arranged to lock said input shaft against rotation upon the occurrence of a torque in said lead screw in excess of a predetermined maximum torque.

4. A linear motion actuator for controlling the movement of a load which tends to overrun the actuator in one direction of movement, comprising a housing, a lead screw having an inner end rotatably mounted in said housing, a nut on said lead screw for carrying said load and arranged to impart an axial force on said screw in the overrunning direction of said load, an axially energized brake including one member fixed relative to said housing and another member supported on said inner end and biased into frictional engagement with said one member by said axial force in the overrunning direction of said load, lead screw drive means in said housing including a driving dog rotatably mounted therein, and a plurality of torque transmitting members of fixed length extending between said dog and said other member and being normally inclined with respect to the axis of said lead screw for imparting a component of the rotational force of said dog to said other member in opposed relation to said axial force to relieve the frictional engagement of said brake members when driving said load in said overrunning direction.

5. A linear motion actuator for controlling the movement of a load which tends to overrun the actuator in one direction of movement, comprising a housing, a lead screw having an inner end rotatably mounted in said housing, a nut on said lead screw for carrying said load and arranged to impart an axial force on said screw in the overrunning direction of said load, an axially energized brake including one member fixed relative to said housing and another member supported on said inner end and biased into frictional engagement with said one member by said axial force in the overrunning direction of said load, lead screw drive means in said housing including a driving dog rotatably mounted therein, a plurality of torque transmitting members extending between said dog and said other member and including bodies normally inclined with respect to the axis of said lead screw for imparting a component of the rotational force of said dog to said other member in opposed relation to said axial force to relieve the frictional engagement of said brake members when driving said load in said overrunning direction, and at least one of said brake members having a friction surface formed of a material having an increasing coefficient of friction with increasing slipping speed for reducing the tendency of self-induced cyclic vibrations when driving said load in said overrunning direction.

6. A linear motion actuator for positioning a load which usually tends to overrun the actuator in one direction of movement, comprising a housing, a lead screw having an inner end rotatably mounted in said housing, a nut on said lead screw for carrying said load and arranged to impart an axial force inwardly on said screw in compression when said load tends to overrun and an axial force outwardly in tension under conditions when work is put into said load, an axially energized brake including one member fixed relative to said housing and another member supported on said inner end and biased into frictional engagement with said one member by said inward force, lead screw drive means in said housing including a driving dog rotatably mounted therein, and a plurality of torque transmitting members of fixed length extending between said dog and said other member and being normally inclined with respect to the axis of said lead screw for imparting a component of the rotational force of said dog to said other member in opposed relation to said inward axial force to relieve the frictional engagement of said brake members when driving said load in said overrunning direction, and brake means having elements connected to said lead screw and said housing and arranged to induce a frictional load resisting the rotation of said lead screw when said screw is in tension.

References Cited in the file of this patent

UNITED STATES PATENTS

| | | |
|---|---|---|
| 442,466 | Taylor | Dec. 9, 1890 |
| 710,759 | Coleman et al. | Oct. 7, 1902 |
| 2,372,026 | Smith | Mar. 20, 1945 |
| 2,525,402 | Dehn | Oct. 10, 1950 |
| 2,550,801 | Geerds | May 1, 1951 |
| 2,918,275 | Arlanskas | Dec. 22, 1959 |
| 2,939,332 | Peterson | June 7, 1960 |
| 2,983,339 | Neff | May 9, 1961 |